United States Patent [19]

Newsham et al.

[11] Patent Number: 5,691,011

[45] Date of Patent: Nov. 25, 1997

[54] DISPERSION-PREVENTING PATTERN FOR LIQUID CRYSTAL DISPLAY DEVICE

[75] Inventors: Mark D. Newsham; Benjamin M. DeKoven, both of Midland, Mich.

[73] Assignee: The Dow Chemical Company, Midland, Mich.

[21] Appl. No.: 665,203

[22] Filed: Jun. 14, 1996

[51] Int. Cl.$^6$ ............................. G02B 5/20; G02F 1/1335
[52] U.S. Cl. ............... 428/1; 428/195; 428/207; 349/106; 349/110; 427/164; 427/166; 427/167
[58] Field of Search ............... 428/1, 195, 207; 349/106, 110; 427/164, 166, 167

[56] References Cited

FOREIGN PATENT DOCUMENTS

| | | |
|---|---|---|
| 59-75205 | 4/1984 | Japan . |
| 5-224012 | 9/1993 | Japan . |
| 6-347637 | 12/1994 | Japan . |
| 7-35915 | 2/1995 | Japan . |

OTHER PUBLICATIONS

Ferguson, Gregory S. et al., Macromolecules, vol. 26, pp. 5870–5875 (Oct. 1993).

*Primary Examiner*—Alexander Thomas
*Attorney, Agent, or Firm*—Reid S. Willis

[57] ABSTRACT

The present invention is a liquid crystal display device comprising a color filter which comprises: a) a transparent substrate; b) an opaque material disposed as a pattern on a major surface of the substrate, which pattern defines borders within which a coloring agent or agents can be received; c) a silicate layer superposing the opaque material, the silicate layer having reactive sites; d) a sufficient concentration of organosiloxane groups bonded to the reactive sites of the silicate layer to render the opaque material dispersion inhibiting; and e) at least one coloring agent disposed within the borders defined by the opaque material.

In another aspect, the present invention is a method of preparing a color filter for a liquid crystal display device that comprises organosiloxane groups bonded to the surface of a black material disposed on a transparent substrate in such a manner as to form borders for wells or channels adapted to receive coloring materials, the bonded organosiloxane groups being prepared by the steps of: a) exposing the black material to a silicon tetrahalide and sufficient water to form a silicate layer on the opaque material; b) contacting the silicate layer with an organosiloxating reagent to form organosiloxane groups bonded to the silicate layer; and c) disposing a coloring agent into at least one well or channel.

The present invention provides an effective means of creating dispersion-preventing patterns for color filters in LCDs.

11 Claims, 1 Drawing Sheet

DISPERSION-PREVENTING PATTERN FOR LIQUID CRYSTAL DISPLAY DEVICE

BACKGROUND OF THE INVENTION

Color filters for liquid crystal display devices (LCDs) are generally formed by depositing red, green, and blue materials on a transparent substrate within the borders of an opaque material, usually referred to as a black grid or black matrix, which provides contrast and definition for the colored materials. The black grid usually contains a chrome metal, the back surface of which is either oxidized or coated with an oxide of chromium light absorbing film, or a mixture of organic pigments or dyes to form a black organic border.

The colored materials can be deposited within the borders of the black matrix using a variety of methods including photolithographic, pigment dispersion, electrodeposition, printing, and ink jet methods. Printing and ink jet methods typically require fewer steps and are therefore less costly than other conventional methods, but suffer from causing bleeding and mixing of colored species across the black grid, which is easily wetted by the ink. Accordingly, efforts have been made to create reliable and inexpensive color filters having black grids that prevent this undesirable cross-contamination of colors.

In Japanese Public Patent Disclosure Bulletin No. 5-224012, incorporated herein by reference, Matsumura discloses a method for manufacturing color filters for high-quality liquid crystal displays that can reliably prevent ink blotting and color mixing, especially in cases where the colored parts are formed by printing or ink jet methods. Specifically, Matsumura discloses a method of manufacturing color filters for liquid crystal displays by the steps of spreading a photosensitive resin layer on a transparent substrate; exposing and photolithographically developing the resin layer to form a desired pattern; laminating an ink-repelling silicon-based rubber layer, generally a crosslinked organic polysiloxane, on top of the patterned resin layer; and removing the exposed photosensitive resin layer along with the rubber layer on top of it, thereby forming wells for the colored materials.

In Japanese Public Patent Disclosure Bulletin No. 59-75205, incorporated herein by reference, a technology is disclosed which uses the ink jet method to distribute "coloring matters" of three colors on the substrate. The publication also discloses that a dispersion-preventing pattern (that is, a pattern that prevents ink blotting and color mixing) made from a substance with poor wettability is effective, but no specific technology is disclosed.

In Japanese Public Patent Disclosure Bulletin H6-347637, Tabayashi discloses a partitioning pattern containing a fluorine-based water-and-oil-repellent agent. In Japanese Public Patent Disclosure Bulletin H7-35915, Nakahara et al. discloses a black matrix comprising a black resin layer containing fluorine-containing compounds and/or silicon containing compounds.

There remains a need for new approaches to create dispersion-preventing black grids for color filters.

SUMMARY OF THE INVENTION

In one aspect, the present invention is a liquid crystal display device comprising a color filter which comprises:

a) a transparent substrate;

b) an opaque material disposed as a pattern on a major surface of the substrate, which pattern defines borders within which a coloring agent or agents can be received;

c) a silicate layer superposing the opaque material, the silicate layer having reactive sites;

d) a sufficient concentration of organosiloxane groups bonded to the reactive sites of the silicate layer to render the opaque material dispersion inhibiting; and e) at least one coloring agent disposed within the borders defined by the opaque material.

In another aspect, the present invention is a method of preparing a color filter for a liquid crystal display device that comprises an opaque material disposed on a transparent substrate in such a manner as to form borders for wells or channels adapted to receive coloring materials comprising the steps of:

a) exposing the opaque material to a silicon tetrahalide and sufficient water to form a silicate layer on the opaque material;

b) contacting the silicate layer with an organosiloxating reagent to form organosiloxane groups bonded to the silicate layer; and c) disposing a coloring agent into at least one well or channel.

The present invention provides an effective means of creating dispersion-preventing patterns for color filters in LCDs.

DETAILED DESCRIPTION OF THE INVENTION

Figure 1:
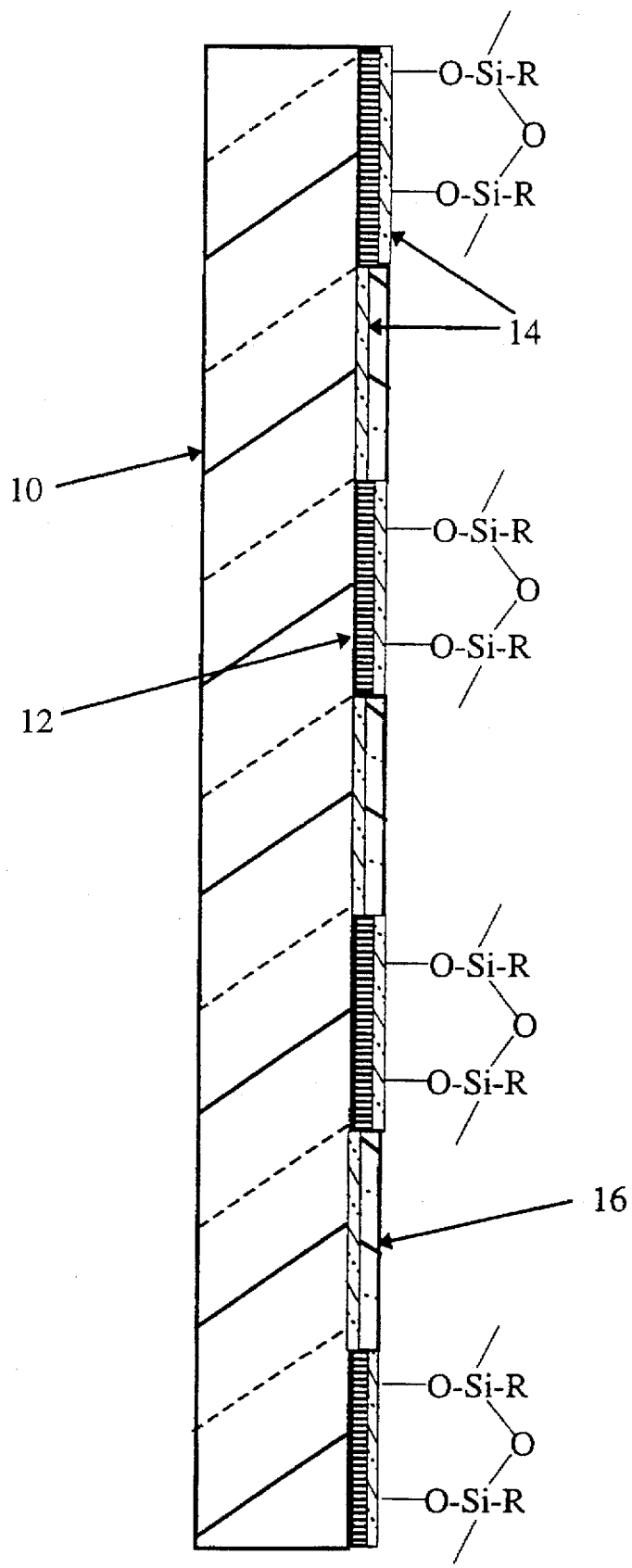
FIG. 1 is a side view of a dispersion-preventing pattern for a color filter.

The opaque, dispersion-preventing pattern for the color filter can be prepared from a transparent substrate patterned with an opaque material that forms black borders within which color agents can be disposed. Methods for preparing the black borders on the transparent substrate are well known in the art and include photolithographic, electrodeposition, and printing methods such as screen offset, gravure, flexographic or ink jet methods. The pattern is generally in the form of crisscrossed bars (that is, a grid which defines substantially rectangular wells) or parallel bars (that is, channels), adapted to receive coloring agents. The width of the bars is typically from about 10 µm, preferably from about 20 µm, to about 100 µm, more preferably to about 30 µm.

The opaque material may comprise a curable, organic resin and a blackening material. Examples of preferred resins include photoactive heat-curable resins such as polyimide, epoxy, polyester, acrylic, methacrylic, melamine, and novolak resins containing photoactive groups such as naphthoquinone diazide. Examples of blackening materials include carbon black, lampblack, pigments, and dyes.

Alternatively, the opaque material may comprise an oxide of a metal such as titanium, chromium, and nickel. In this case, blackening materials aren't necessary, since the metal oxides provide the desired contrast.

In a first step of preparing the dispersion-preventing patterned device of the present invention, the substrate and patterned opaque material are advantageously cleaned to remove adventitious carbon and to form oxygen-containing polar substituents on the surface of the opaque material. A preferred method of cleaning and introducing polar substituents is plasma oxidation. The polar substituents can then be reacted with a halosilane, preferably silicon tetrachloride, to form a silicate layer that is believed to be less than about 100 nm thick. The reaction is carried out in the presence of sufficient moisture to form the silicate layer. Preferably, the reaction is carried out at a relative humidity of from about 10, more preferably from about 25, and most preferably from about 35 percent, to about 90, more preferably to about 75, and most preferably to about 50 percent.

Alternatively, a silicate layer can be formed on the substrate and opaque material by plasma enhanced chemical vapor deposition (PECVD) by methods such as those known in the art.

Dispersion-inhibiting organosiloxane groups can be bonded to the reactive sites of the silicate layer by exposing the silicate surface to a hydrolyzable organosilane of the type:

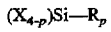

$(X_{4-p})Si-R_p$ where X is a hydrolyzable group; R is a nonhydrolyzable organic radical that may possess a functionality that imparts desired characteristics; and p is 1, 2, or 3. The hydrolyzable organosilane is preferably of the type:

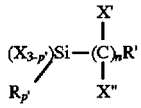

where n is a positive integer, preferably from 2, more preferably from 6, and most preferably from 8, to preferably 32, more preferably to 24, and most preferably to 20; p' is 0, 1, or 2; X is preferably Cl, Br, F, alkoxy, or acyloxy, more preferably Cl, Br, methoxy, or ethoxy, and most preferably Cl; X' and X" are each independently F or H; R is H, —CH$_3$, —CH$_2$CH$_3$, or allyl; and R' is H, —CF$_3$, or a reactive functional group, such as —CH=CH$_2$.

Examples of suitable alkylhalosilanes include trichloro-19-eicosenylsilane (Chem. Abstracts Reg. No. 154598-78-4), trichloro-17-octadecenylsilane (Chem. Abstracts Reg. No. 144285-91-6), trichlorononadecylsilane (Chem. Abstracts Reg. No. 134706-83-5), trichloroheptadecylsilane (Chem. Abstracts Reg. No. 126104-25-4), trichloro-18-nonadecenylsilane (Chem. Abstracts Reg. No. 125282-19-1), trichloro-16-heptadecenylsilane (Chem. Abstracts Reg. No. 120905-09-1), trichloro-15-hexadecenylsilane (Chem. Abstracts Reg. No. 85121-62-6), trichloro-14-pentadecenylsilane (Chem. Abstracts Reg. No. 85121-63-7), trichloroheptylsilane (Chem. Abstracts Reg. No. 82850-25-7), trichloropentadecylsilane (Chem. Abstracts Reg. No. 60592-74-7), trichloro(methyloctadecyl)trichlorosilane (Chem. Abstracts Reg. No. 60085-13-4), trichloro-9-decenylsilane (Chem. Abstracts Reg. No. 52217-59-1), trichloro-13-tetradecenylsilane (Chem. Abstracts Reg. No. 52217-58-0), trichloro-7-octenylsilane (Chem. Abstracts Reg. No. 52217-52-4), trichloro-5-hexenylsilane (Chem. Abstracts Reg. No. 18817-29-3), trichloroeicosylsilane (Chem. Abstracts Reg. No. 18733-57-8), trichlorotridecylsilane (Chem. Abstracts Reg. No. 18406-99-0), trichlorotetradecylsilane (Chem. Abstracts Reg. No. 18402-22-7), trichloroundecylsilane (Chem. Abstracts Reg. No. 18052-07-8), trichloro-10-undecenylsilane (Chem. Abstracts Reg. No. 17963-29-0), trichlorodecylsilane (Chem. Abstracts Reg. No. 13829-21-5), trichlorohexadecylsilane (Chem. Abstracts Reg. No. 5894-60-0), trichlorononylsilane (Chem. Abstracts Reg. No. 5283-67-0), trichlorooctylsilane (Chem. Abstracts Reg. No. 5283-66-9), trichlorododecylsilane (Chem. Abstracts Reg. No. 4484-72-4), trichloropentenylsilane (Chem. Abstracts Reg. No. 2504-62-3), hexyltrichlorosilane (Chem. Abstracts Reg. No. 928-65-4), heptyltrichlorosilane (Chem. Abstracts Reg. No. 871-41-0), trichlorooctadecylsilane (Chem. Abstracts Reg. No. 112-04-9), and trichloropentylsilane (Chem. Abstracts Reg. No. 107-72-2).

Examples of fluorinated alkyltrichlorosilanes include nonafluorohexyltrichlorosilane (Chem. Abstracts Reg. No. 164081-94-1), perfluorodecyltrichlorosilane (Chem. Abstracts Reg. No. 155303-07-4), and perfluorododecyltrichlorosilane (Chem. Abstracts Reg. No. 152339-98-9), and 1H, 1H, 2H, 2H-perfluorodecyldimethylchlorosilane.

The siloxating reagent is contacted with the silicate layer, preferably by a stamping procedure, wherein reagent is absorbed into an absorbing medium (a stamping pad), then transferred preferentially to the exposed silicate without substantially contacting the exposed substrate within the borders of the patterned material. The stamping pad preferably has the following properties: a) it absorbs the alklyhalosilane; b) it minimally deforms during stamping so that the wells or channels are not substantially contacted; c) it physically contacts the top of the treated opaque material; and d) it transfers the alkylhalosilane to the surface of the opaque material. Preferred materials for the pad include polydimethylsiloxane (PDMS), natural rubber, butadiene rubber, polyisoprene, and the like, with PDMS being especially preferred.

The resulting modified patterned composition comprises at least 3 distinct layers: the opaque material; the silicate surface layer; and organosiloxane groups bonded to the surface of the silicate layer. A side view of the the patterned compostion is illustrated in FIG. 1 (not to scale). Referring now to FIG. 1, the transparent substrate (10) is patterned with an opaque material (12) in such a manner as to create wells. A thin silicate layer (14) coats the surface of the opaque material and the wells. A plurality of siloxane chains are bonded preferentially to the silicate layer on the opaque material (12). The modified patterned composition is advantageously heated to temperatures in the range of about 100° C. to about 300° C. to produce even better dispersion-preventing properties.

A coloring agent (16) can then be added directly into the wells, preferably with precise adjustment (that is, registration) of the color-adding means, such as high or low resolution ink jet printing, or gravure, screen offset, or flexographic methods. By virtue of the dispersion-preventing patterned substrate, coloring agents can be advantageously applied with a less costly low resolution printer, since the problems of blotting and color mixing are substantially eliminated.

The following example is for illustrative purposes only and is not intended to limit the scope of this invention.

EXAMPLE 1

Preparation of Dispersion-Preventing Pattern for a Color Filter

A laminate consisting of a glass substrate patterned with a black DARC™ 100 polyimide polymer matrix (trademark of Brewer Science, Inc.) having a well dimension of 120× 120 µm² and a thickness of 2.0 µm is cleaned and chemically activated in an oxygen plasma (Harrick Plasma/Sterilizer Model PDC-32G, 2 minutes, 200 mTorr O$_2$), then exposed to SiCl$_4$ by placing the laminate patterned-side down over a polystyrene dish. One mL of SiCl$_4$ is then added to the bottom of the dish. The vapor phase reacts to form a silicate layer and is allowed to proceed for 1 minute in a humidity-controlled environment using a Flow-Temperature-Humidity Control System Model HCS-201 (relative humidity of 38 to 42 percent, at 27° C., obtained from Miller-Nelson Research, Inc.). The laminate is removed from the dish.

A PDMS stamping pad is prepared using a SYLGARD™ 184 silicone elastomer kit (trademark of Dow Corning Corp.). A pad is prepared by mixing 27 g of the elastomer with 2.7 g of SYLGARD curing agent in a polystyrene dish. After 30 minutes, the dish and its contents are placed in an oven at 70° C. for one hour to cure the elastomer. The cured PDMS sample is then allowed to cool to room temperature, whereupon a 50×50 mm² pad is cut from the sample.

n-Hexadecyltrichlorosilane ($C_{16}$) is absorbed into the pad using the following procedure. The PDMS pad is supported in a vacuum vessel over a dish containing 1 mL of the $C_{16}$ liquid. The vacuum vessel is pumped for 15 minutes to a pressure of 300 mTorr so that the PDMS stamping pad can absorb the $C_{16}$ vapor. The PDMS stamping pad is then placed on top of the black matrix in a humidity-controlled chamber (relative humidity 40 to 45 percent, at 27° C.). The stamping pad is removed from the black matrix after a contact time of 2 minutes. The modified patterned composition is then heated to 180° C. (heating rate of 10 C.°/minute) to improve the dispersion-preventing characteristics of the black matrix.

The black matrix is then tested for its dispersion-preventing characteristics by ink jet printing colored materials into the wells defined by the black matrix. The ink is prepared by mixing CYMEL™ 303 (trademark of CYTEC Industries, Inc, 76.08 g), ELVACITE™ 2810 (trademark of ICI Acrylics, 50.66 g), NH₄SCN (10.73 g), NEOZAPON™ Red 355 (trademark of BASF, 46.66 g), NEOPEN™ Yellow 159 (trademark of BASF, 41.40 g), and Dow Corning Corp. Additive 57™ (trademark of Dow Corning Corp., 1.93 g) in ethanol (400 g) and methylpropyl ketone (325 g). Ink jet printing, using an Imaje JAIME 1000 Model S31.1P ink jet printer, is carried out at room temperature. The printed ink is cured by ramping from room temperature to 230° C. at 10 C.°/minute and holding at 230° C. for 10 minutes.

Profile plots of the ink jet printed drops are obtained using a Tencor Instruments Alpha Step 200 profilometer. The profile plot of an ink drop that is applied near the center of a well indicates that the dispersion-preventing pattern not only confines the ink drop in the well, but does not allow the ink to remain on top of the matrix. By comparison, when an ink drop is applied to an untreated black matrix, a significant amount of ink remains on top of the matrix.

What is claimed is:

1. A liquid crystal display device comprising a color filter which comprises:
   a) a transparent substrate;
   b) an opaque material disposed as a pattern on a major surface of the substrate, which pattern defines borders within which a coloring agent or agents can be received;
   c) a silicate layer superposing the opaque material, the silicate layer having reactive sites;
   d) a sufficient concentration of organosiloxane groups bonded to the reactive sites of the silicate layer to render the opaque material dispersion inhibiting; and
   e) at least one coloring agent disposed within the borders defined by the opaque material.

2. The liquid crystal display device of claim 1 wherein the opaque material is disposed as a grid on the major surface of the substrate, which grid defines substantially rectangular wells for receiving coloring agents.

3. The liquid crystal display device of claim 1 wherein the organosiloxane groups comprise a $C_4$–$C_{20}$ alkyl or fluoroalkylsiloxane.

4. A method of preparing a color filter for a liquid crystal display device that comprises an opaque material disposed on a transparent substrate in such a manner as to form borders for wells or channels adapted to receive coloring materials comprising the steps of:
   a) exposing the opaque material to a silicon tetrahalide and sufficient water to form a silicate layer on the opaque material;
   b) contacting the silicate layer with an organosiloxating reagent to form organosiloxane groups bonded to the silicate layer; and
   c) disposing a coloring agent into at least one well or channel.

5. The method of claim 4 wherein the silicate layer is formed by plasma oxidation of the black material followed by exposure of the plasma-oxidized black material to silicon tetrachloride.

6. The method of claim 4 wherein the silicate layer is formed by plasma-enhanced chemical vapor deposition.

7. The method of claim 4 wherein the siloxating reagent is represented by the following structure:

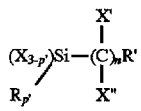

where p' is 0, 1, or 2; X is Cl, Br, F, alkoxy, or acyloxy; X' and X" are each independently F or H; n is an integer from 2 to 32; R is H, —CH₃, —CH₂CH₃, or allyl; and R' is H, —CF₃, or —CH═CH₂.

8. The method of claim 7 wherein X is chloro, n is an integer from 8 to 20, and p is 0.

9. The method of claim 4 wherein the alkoxylating reagent is trichloro-19-eicosenylsilane, trichloro-17-octadecenylsilane, trichlorononadecylsilane, trichloroheptadecylsilane, trichloro-18-nonadecenylsilane, trichloro-16-heptadecenylsilane, trichloro-15-hexadecenylsilane, trichloro-14-pentadecenylsilane, trichloroheptylsilane, trichloropentadecylsilane, trichloro(methyloctadecyl)trichlorosilane, trichloro-9-decenylsilane, trichloro-13-tetradecenylsilane, trichloro-7-octenylsilane, trichloro-5-hexenylsilane), trichloroeicosylsilane, trichlorotridecylsilane, trichlorotetradecylsilane, trichloroundecylsilane, trichloro-10-undecenylsilane, trichlorodecylsilane, trichlorohexadecylsilane, trichlorononylsilane, trichlorooctylsilane, trichlorododecylsilane, trichloropentenylsilane, hexyltrichlorosilane, heptyltrichlorosilane, trichlorooctadecylsilane, and trichloropentylsilane, nonafluorohexyltrichlorosilane, perfluorodecyltrichlorosilane, and perfluorododecyltrichlorosilane, or 1H, 1H, 2H, 2H-perfluorodecyldimethylchlorosilane.

10. The method of claim 4 wherein the siloxating reagent is contacted with the silicate by absorbing the reagent into a stamping pad, then transferring the reagent preferentially to the exposed silicate without substantially contacting the exposed substrate within the borders of the black material.

11. The method of claim 10 wherein the stamping pad comprises polydimethylsiloxane.

* * * * *

UNITED STATES PATENT AND TRADEMARK OFFICE
CERTIFICATE OF CORRECTION

PATENT NO. : 5,691,011

DATED : November 25, 1997

INVENTOR(S) : Mark D. Newsham; Benjamin M. DeKoven

It is certified that error appears in the above-indentified patent and that said Letters Patent is hereby corrected as shown below:

Column 1, after the title, please add the following heading and paragraph
--<u>Statement of Federally Sponsored Research</u>

This invention was made with United States Government support under Government Contract F33615-94-C-4407. The Government has certain rights in the invention.--

Signed and Sealed this

Twenty-fourth Day of February, 1998

Attest:

BRUCE LEHMAN

*Attesting Officer*  *Commissioner of Patents and Trademarks*